C. W. CATHCART.
Thrashing Machine.
No. 3,558. Patented April 25, 1844.
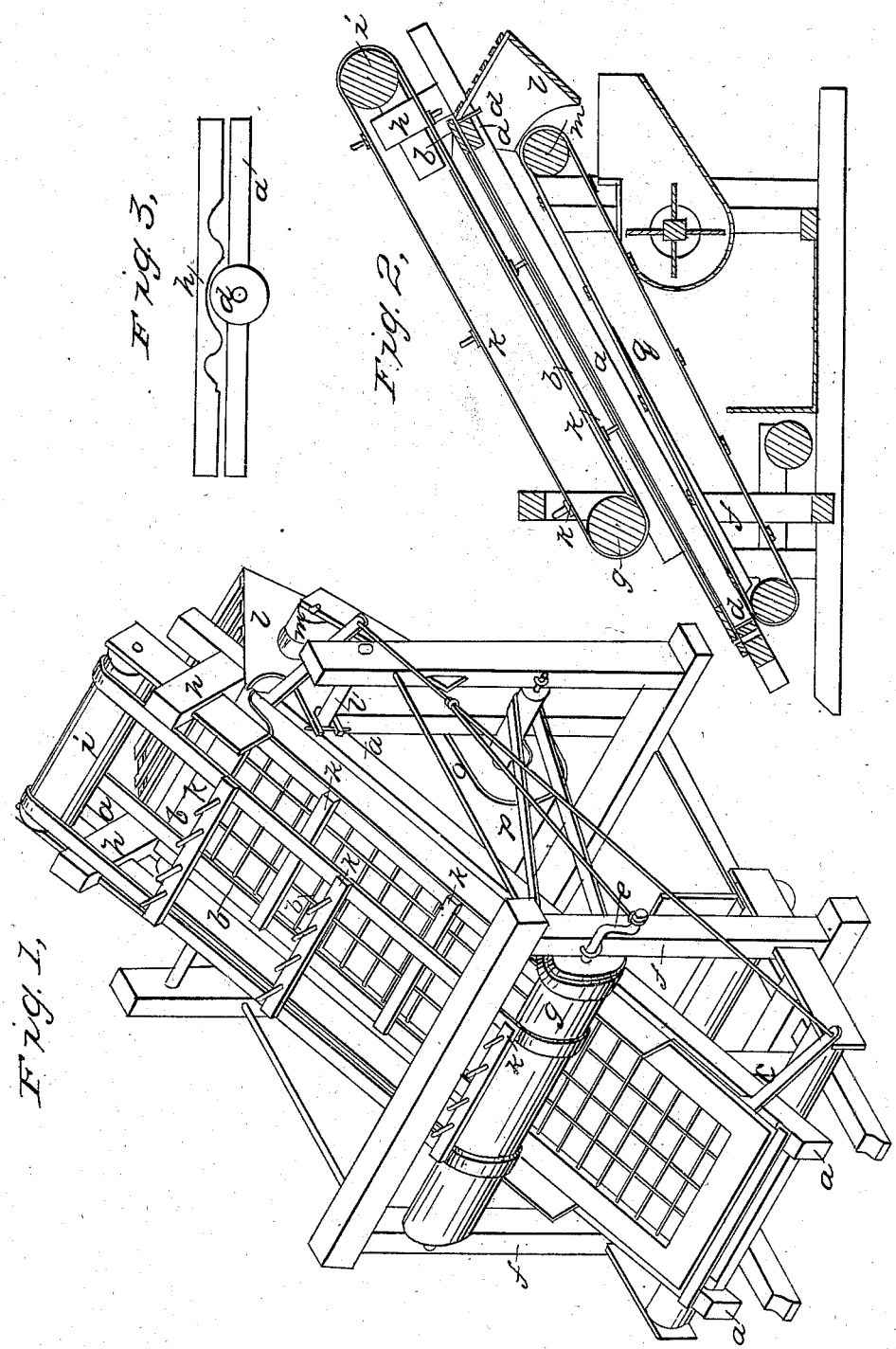

UNITED STATES PATENT OFFICE.

CHARLES W. CATHCART, OF NEW DURHAM, INDIANA.

THRESHING-MACHINE.

Specification of Letters Patent No. 3,558, dated April 25, 1844.

*To all whom it may concern:*

Be it known that I, CHARLES W. CATHCART, of New Durham, in the county of Laport and State of Indiana, have invented a new and useful Improvement in Cleaning Grain from Straw, Chaff, &c., after Threshing; and I do hereby declare that the following is a full, clear, and exact description thereof, reference being had to the accompanying drawing, which forms a part of my specification, in which—

Figure 1, is an isometrical view, Fig. 2, a vertical section, Fig. 3 detached parts.

In constructing this machine a suitable frame is constructed, the cap pieces ($a$) of which stand at an angle of about 30° from the horizontal; on these a screen, or open slat work frame ($b$) lays, that is made to move back and forth by bell cranks ($c$) attached to it at each end; it moves on rollers ($d$) (see Fig. 3) placed in cross ties of the cap pieces; the bottom being uneven causes it to shake; (this is shown in detached Fig. 3.) The bell cranks are moved by a crank ($e$) attached to the journal of one of the rollers of the endless rake, hereafter described. Near the lower end of the screen are two upright posts ($f$) framed to a cross piece below, and standing out from the side frame a little distance. The lower roller ($g$) of the endless rake is sustained in these posts, directly over the screen, and has the crank ($e$) connected with it. On two short posts ($h$) projecting from the cap at the upper end, is another roller ($i$) and two endless bands are stretched from one to the other rollers ($g$ and $i$) and on them are rakes ($k$), attached by each end to the belts, and extending across the screens from side to side. Just under the upper end of the inclined cap pieces ($a$) is a little frame ($l$) the outer end of which is triangular in its section Fig. 2, and the width of the frame of the machine; the upper side is formed of slats and the lower one of close boarding which directs any grain that may be carried over the riddle and falls through the slats, back into the fan; the frame is attached to the machine by a bolt ($l'$) through each side, and is shaken by a cam roller ($m$) placed under it—below this a fan ($o$) is placed with the usual appendages of screens, &c., the fan being driven by a band ($p$) from the roller ($g$). Directly under the screen ($b$) there is an endless apron ($q$) extended the whole length of the screen on two rollers; it has slats fastened across it, which keep it extended, and carry up the grain that falls through the screen to the fan, where it is cleaned. The endless apron may extend under the concave of the thresher when an open one is used by which all the grain that falls is carried up.

I do not claim the movable screen or a movable elevator, but—

What I claim as my invention, and desire to secure by Letters Patent is—

1. The combination of the movable screen revolving rake above and endless apron elevator below, in the manner substantially as herein described.

2. I also claim the shaking frame ($l$) in combination with the above constructed and arranged as set forth.

CH. W. CATHCART.

Witnesses:
J. J. GREENOUGH,
LAFAYETTE CALDWELL.